US012760151B2

(12) United States Patent
Fontana et al.

(10) Patent No.: US 12,760,151 B2
(45) Date of Patent: Oct. 13, 2026

(54) (PER)FLUOROPOLYETHER POLYMERS AND USE THEREOF

(71) Applicant: SYENSQO SPECIALTY POLYMERS ITALY S.p.A, Bollate (IT)

(72) Inventors: Simonetta Antonella Fontana, Milan (IT); Andrea Lotierzo, Brugherio (IT); Mary Thomson, Milan (IT)

(73) Assignee: SYENSQO SPECIALTY POLYMERS ITALY S.p.A., Bollate (IT)

(*) Notice: Subject to any disclaimer, the term of this patent is extended or adjusted under 35 U.S.C. 154(b) by 777 days.

(21) Appl. No.: 18/249,026

(22) PCT Filed: Sep. 30, 2021

(86) PCT No.: PCT/EP2021/076919

§ 371 (c)(1),
(2) Date: Apr. 13, 2023

(87) PCT Pub. No.: WO2022/078766

PCT Pub. Date: Apr. 21, 2022

(65) Prior Publication Data

US 2023/0391958 A1 Dec. 7, 2023

(30) Foreign Application Priority Data

Oct. 14, 2020 (EP) .................................... 20201711

(51) Int. Cl.

*C08L 71/00* (2006.01)
*C08G 77/388* (2006.01)
*C08G 65/00* (2006.01)

(52) U.S. Cl.

CPC ......... *C08G 77/388* (2013.01); *C08G 65/007* (2013.01); *C08L 71/00* (2013.01)

(58) Field of Classification Search

CPC .............................. C08G 65/077; C08G 71/00
See application file for complete search history.

(56) References Cited

U.S. PATENT DOCUMENTS

| | | | | |
|---|---|---|---|---|
| 4,968,537 | A * | 11/1990 | Lenti | C04B 41/4846 427/393.6 |
| 5,011,713 | A * | 4/1991 | Lenti | C08G 65/007 427/393.6 |
| 5,536,578 | A | 7/1996 | Shoji et al. | |
| 5,656,201 | A | 8/1997 | Visca et al. | |
| 6,083,600 | A | 7/2000 | Kasai et al. | |
| 9,523,795 | B2 * | 12/2016 | Wakizaka | C08K 7/18 |
| 2008/0003261 | A1 * | 1/2008 | Schorzman | C08G 65/33306 424/428 |
| 2011/0171458 | A1 | 7/2011 | Burger et al. | |
| 2015/0191608 | A1 | 7/2015 | Park et al. | |
| 2015/0336968 | A1 | 11/2015 | Howell et al. | |
| 2019/0106538 | A1 | 4/2019 | Valsecchi et al. | |
| 2023/0391951 | A1 * | 12/2023 | Thomson | C09D 5/025 |

FOREIGN PATENT DOCUMENTS

| | | | |
|---|---|---|---|
| AU | 2012314478 | B2 | 11/2016 |
| CN | 105176342 | A | 12/2015 |
| EP | 1810987 | A1 | 7/2007 |
| EP | 3312242 | A1 | 4/2018 |
| JP | 2014237227 | A | 12/2014 |
| TW | 201512339 | A | 4/2015 |
| WO | 2012055885 | A1 | 5/2012 |
| WO | 2013045496 | A1 | 4/2013 |
| WO | 2016079195 | A1 | 5/2016 |
| WO | 2016153230 | A1 | 9/2016 |
| WO | 2019106366 | A1 | 6/2019 |

OTHER PUBLICATIONS

International Search Report issued in International Application No. PCT/EP2021/076919 dated Jan. 31, 2022 (3 pages).
Written Opinion issued in International Application No. PCT/EP2021/076919 dated Jan. 31, 2022 (5 pages).

* cited by examiner

*Primary Examiner* — Margaret G Moore
(74) *Attorney, Agent, or Firm* — Osha Bergman Watanabe & Burton LLP

(57) ABSTRACT

The present invention relates to compositions comprising novel (per)fluoropolyether polymers, endowed with antimicrobial properties, to methods for the manufacture thereof and to their use to provide compositions having antimicrobial properties.

19 Claims, No Drawings

(PER)FLUOROPOLYETHER POLYMERS AND USE THEREOF

CROSS-REFERENCE TO RELATED PATENT APPLICATIONS

This application is a national stage entry of PCT/EP2021/076919, filed on Sep. 30, 2021, which claims the priority of patent application filed on 14 Oct. 2020 in EUROPE with Nr. 20201711.7, the whole content of this application being incorporated herein by reference for all purposes.

TECHNICAL FIELD

The present invention relates to compositions comprising novel (per)fluoropolyether polymers, endowed with antimicrobial properties, to methods for the manufacture thereof and to their use to provide compositions having antimicrobial properties.

BACKGROUND ART

The use of (per)fluoropolyether (PFPE) polymers as ingredients in the manufacture of anti-soil coating compositions, for coating different types of substrates is known in the art. For example, EP 3312242 (3M Innovative Properties Company) discloses protective coating compositions with mixed functionalities, wherein PFPE are mentioned among other backbones; WO 2016/079195 (Solvay Specialty polymers Italy S.p.A.) discloses zwitterionic derivatives of PFPE, which are disclosed as suitable for coating applications; WO 2019/106366 (Sphere Fluidic Limited) discloses surfactants comprising perfluoropolyether structure.

Among the others, the coating of security documents, such as notably banknotes, using such PFPE polymers was disclosed for example in WO 2012/055885 (Oberthur Fiduciaire SAS) and WO 2013/045496 (Oberthur Fiduciaire SAS, Solvay Specialty Polymers Italy S.p.A.).

Coatings having anti-bacterial and/or anti-viral properties have been also disclosed in the art, for example in JP2014237227 (Central Glass Co.), TW201512339 (Alpha Bright Int. Co., LTD.), US 2015/191608 (Industrial Academic Cooperation Group Seoul National University; Samsung Electronics CO., LTD.; Snu R And DB Foundation); WO 2016/153230 (Ceko Co., LTD.); CN105176342 (Xiamen Boensi Applic Material Science and Technology CO., LTD.).

However, the recent spread of coronavirus disease (COVID-19) caused by severe acute respiratory syndrome coronavirus 2 (SARS-CoV-2) increased the importance of developing compositions endowed with antimicrobial (including but not limited to anti-bacterial, anti-fungal and anti-viral properties), such compositions being suitable for coating a wide variety of substrates, including notably paper, banknotes, glass and plastic, notably for electronic and smart devices.

SUMMARY OF INVENTION

Within this frame, the Applicant faced the problem of developing novel polymers endowed with antimicrobial properties.

More in particular, the Applicant developed novel (per) fluoropolyether (PFPE) polymers endowed with antimicrobial properties, said properties being provided by specific functional group(s) bonded to the (per)fluoropolyether backbone.

Advantageously, the chemical structure of the novel PFPE polymers according to the present invention is such that the polymers are endowed with antimicrobial properties, while providing the properties of coatings, such as notably transparency together with water- and oil-repellency.

Thus, in a first aspect, the present invention relates to a composition [composition ($C^{POL}$)] comprising:

a (per)fluoropolyether polymer [polymer ($P^P$)] comprising a (per)fluoropolyether chain [chain ($R_{pf}$)] having two chain ends bonded to opposite sides of said chain ($R_{pf}$), wherein one chain end comprises at least one group comprising at least one quaternary ammonium salt group [group ($N^+$)] and the other chain end comprises at least one group selected in the group consisting of: alkoxysilane [group (Si)] and cross-linkable group, preferably selected from unsaturated moiety [group (U)] and epoxide [group (E)];

a (per)fluoropolyether polymer [polymer ($P^U$)] comprising a (per)fluoropolyether chain [chain ($R_{pf}$)] having two chain ends bonded to opposite sides of said chain ($R_{pf}$), wherein both chain ends comprise one group elected in the group consisting of: alkoxysilane [group (Si)] and cross-linkable group, preferably selected from unsaturated moiety [group (U)] and epoxide [group (E)]; and a (per)fluoropolyether polymer [polymer ($P^N$)] comprising a (per)fluoropolyether chain [chain ($R_{pf}$)] having two chain ends bonded to opposite sides of said chain ($R_{pf}$), wherein both chain ends comprise at least one group ($N^+$).

Advantageously, said composition ($C^{POL}$) Comprises from about 5 to about 50 wt. % of said polymer ($P^P$) based on the total weight of composition ($C^P$).

Said composition ($C^{POL}$) can be used as such to provide an antimicrobial coating or it can be used as ingredient (also referred to as "additive") in a solvent [solvent (S)].

Thus, in a second aspect, the present invention relates to a composition [composition (DIL)] comprising composition ($C^{POL}$) as defined above and at least one solvent [solvent (S)] selected in the group comprising: (per)fluorinated fluids, optionally comprising at least one unsaturated moiety; hydrogenated fluids, optionally comprising at least one unsaturated moiety.

In a third aspect, the present invention relates to the use of composition ($C^{POL}$) or composition (DIL) as described above, to impart antimicrobial properties to a substrate.

DESCRIPTION OF EMBODIMENTS

For the purpose of the present description and of the following claims:

the use of parentheses around symbols or numbers identifying the formulae, for example in expressions like "polymer (P)", etc., has the mere purpose of better distinguishing the symbol or number from the rest of the text and, hence, said parenthesis can also be omitted;

the acronym "PFPE" stands for "(per)fluoropolyether" and, when used as substantive, is intended to mean either the singular or the plural from, depending on the context;

the term "(per)fluoropolyether" is intended to indicate fully or partially fluorinated polyether polymer;

the expression "endowed with antimicrobial properties" is intended to indicate that the polymer is capable of killing or stopping the growth of microorganism, such as bacteria, virus and fungi.

Preferably, composition ($C^{POL}$) comprises from about 5.00 to about 50.00 wt. % of polymer ($P^P$), from about 0.01 to about 15.00 wt. % of polymer ($P^N$), and from about 35.00 to about 94.99 wt. % of polymer ($P^U$), the amounts being based on 100 wt. % of said composition ($C^{POL}$).

More preferably, composition ($C^{POL}$) comprises from about 5.00 to about 48.00 wt. % of polymer ($P^P$), from about 0.10 to about 12.00 wt. % of polymer ($P^N$) and from about 40.00 to about 85 wt. % of polymer ($P^U$), the amounts being based on 100 wt. % of said composition ($C^{POL}$).

Said composition ($C^{POL}$) can further comprise a (per) fluoropolyether polymer [polymer ($P^x$)] comprising a (per) fluoropolyether chain [chain ($R_{pf}$)] having two chain ends bonded to opposite sides of said chain ($R_{pf}$), wherein one chain end comprises a perfluoroalkyl group and the other chain end comprises either at least one group ($N^+$) as defined above or at least one group selected in the group consisting of: alkoxysilane [group (Si)] and cross-linkable group, preferably selected from unsaturated moiety [group (U)] and epoxide [group (E)].

When present, said polymer ($P^X$) is preferably in an amount up to 15 wt. % more preferably in amount from 0.01 to 12 wt. % and even more preferably from 0.05 to 10 wt. %, based on the total weight of composition ($C^{POL}$).

Preferably, in any of polymer ($P^P$), polymer ($P^U$), polymer ($P^N$) and polymer ($P^x$), said chain ($R_{pf}$) is a chain of formula $$-D-(CFX^{\#})_{z1}—O(R_f)(CFX^*)_{z2}-D^*-$$

wherein z1 and z2, equal or different from each other, are equal to or higher than 1;

$X^{\#}$ and $X^*$, equal or different from each other, are —F or —$CF_3$, provided that when z1 and/or z2 are higher than 1, $X^{\#}$ and $X^*$ are —F;

D and D*, equal or different from each other, are a sigma bond or an alkylene chain comprising from 1 to 6 and even more preferably from 1 to 3 carbon atoms, said alkyl chain being optionally substituted with at least one perfluoroalkyl group comprising from 1 to 3 carbon atoms;

($R_f$) comprises, preferably consists of, repeating units R°, said repeating units being independently selected from the group consisting of:

(i) —CFXO—, wherein X is F or $CF_3$;

(ii) —CFXCFXO—, wherein X, equal or different at each occurrence, is F or $CF_3$, with the proviso that at least one of X is —F;

(iii) —$CF_2CF_2CW_2O$—, wherein each of W, equal or different from each other, are F, Cl, H;

(iv) —$CF_2CF_2CF_2CF_2O$—;

(v) —$(CF_2)_j$—CFZ—O— wherein j is an integer from 0 to 3 and Z is a group of general formula —O—$R_{(f-a)}$-T, wherein $R_{(f-a)}$ is a fluoropolyoxyalkene chain comprising a number of repeating units from 0 to 10, said recurring units being chosen among the following: —CFXO—, —$CF_2CFXO$—, —$CF_2CF_2CF_2O$—, —$CF_2CF_2CF_2CF_2O$—, with each of X being independently F or $CF_3$ and T being a $C_1$-$C_3$ perfluoroalkyl group.

Preferably, z1 and z2, equal or different from each other, are from 1 to 10, more preferably from 1 to 6 and even more preferably from 1 to 3.

More preferably, D and D*, equal or different from each other, are a sigma bond, or a chain of formula —$CH_2$—, —$CH_2CH_2$— or —$CH(CF_3)$—.

Preferably, chain ($R_f$) complies with the following formula:

$$—[(CFX^1O)_{g1}(CFX^2CFX^3O)_{g2}(CF_2CF_2CF_2O)_{g3}(CF_2CF_2CF_2CF_2O)_{g4}]— \quad (R_f\text{-I})$$

wherein $X^1$ is independently selected from —F and —$CF_3$, $X^2$, $X^3$, equal or different from each other and at each occurrence, are independently —F, —$CF_3$, with the proviso that at least one of X is —F;

g1, g2, g3, and g4, equal or different from each other, are independently integers ≥0, such that g1+g2+g3+g4 is in the range from 2 to 300, preferably from 2 to 100; should at least two of g1, g2, g3 and g4 be different from zero, the different recurring units are generally statistically distributed along the chain.

More preferably, chain ($R_f$) is selected from chains of formula:

$$—[(CF_2CF_2O)_{a1}(CF_2O)_{a2}]— \quad (R_f\text{IIA})$$

wherein:

a1 and a2 are independently integers ≥0 such that the number average molecular weight is between 400 and 10,000, preferably between 400 and 5,000; both a1 and a2 are preferably different from zero, with the ratio a1/a2 being preferably comprised between 0.1 and 10;

$$—[(CF_2CF_2O)_{b1}(CF_2O)_{b2}(CF(CF_3)O)_{b3}(CF_2CF(CF_3)O)_{b4}]— \quad (R_f\text{-IIB})$$

wherein:

b1, b2, b3, b4, are independently integers ≥0 such that the number average molecular weight is between 400 and 10,000, preferably between 400 and 5,000; preferably b1 is 0, b2, b3, b4 are >0, with the ratio b4/(b2+b3) being ≥1;

$$—[(CF_2CF_2O)_{c1}(CF_2O)_{c2}(CF_2(CF_2)_{cw}CF_2O)_{c3}]— \quad (R_f\text{-IIC})$$

wherein:

cw=1 or 2;

c1, c2, and c3 are independently integers ≥0 chosen so that the number average molecular weight is between 400 and 10,000, preferably between 400 and 5,000; preferably c1, c2 and c3 are all >0, with the ratio c3/(c1+c2) being generally lower than 0.2;

$$—[(CF_2CF(CF_3)O)_d]— \quad (R_f\text{-IID})$$

wherein:

d is an integer >0 such that the number average molecular weight is between 400 and 10,000, preferably between 400 and 5,000;

$$—[(CF_2CF_2C(Hal^*)_2O)_{e1}—(CF_2CF_2CH_2O)_{e2}—(CF_2CF_2CH(Hal^*)O)_{e3}]— \quad (R_f\text{-IIE})$$

wherein:

Hal*, equal or different at each occurrence, is a halogen selected from fluorine and chlorine atoms, preferably a fluorine atom;

e1, e2, and e3, equal to or different from each other, are independently integers ≥0 such that the (e1+e2+e3) sum is comprised between 2 and 300.

Still more preferably, chain ($R_f$) complies with formula ($R_f$-III) here below:

$$-[(CF_2CF_2O)_{a1}(CF_2O)_{a2}]- \quad (R_f\text{-III})$$

wherein:

a1, and a2 are integers >0 such that the number average molecular weight is between 400 and 10,000, preferably between 400 and 5,000, with the ratio a1/a2 being generally comprised between 0.1 and 10, more preferably between 0.2 and 5.

Preferably, in any of polymer ($P^P$), polymer ($P^N$) and polymer ($P^x$), group ($N^+$) is selected in the group comprising, more preferably consisting of:

$$-N^+(R^{h1})(R^{h2})(R^{h3}) \quad (N^+\text{-I})$$

wherein each of $R^{h1}$, $R^{h2}$, and $R^{h3}$ is independently selected from linear or branched alkyl chain having from 1 to 20 carbon atoms, more preferably from 1 to 18, even more preferably from 3 to 18, benzyl or at least two of $R^{h1}$, $R^{h2}$, and $R^{h3}$ together with the nitrogen atom form a 5- or 6-membered aliphatic ring or $R^{h1}$, $R^{h2}$, and $R^{h3}$ together with the nitrogen atom form a 5- or 6-membered aromatic ring.

Preferably, at least one of $R^{h1}$, $R^{h2}$, and $R^{h3}$ is a linear or branched alkyl chain having from 6 to 20, more preferably from 6 to 18 carbon atoms.

Preferably, at least two of $R^{h1}$, $R^{h2}$, and $R^{h3}$ are independently a linear or branched alkyl chain having from 1 to 6, more preferably from 1 to 4 carbon atoms.

Any of polymer ($P^P$), polymer ($P^N$) and polymer ($P^x$) comprises a counter-ion for said group ($N^+$).

Said counter-ion is preferably selected from halogenide, such as chloride, iodide, bromide; mesylate, tosylate, triflate and nonaflate. Mesylate and tosylate are more preferred.

Preferably, in any of polymer ($P^P$), polymer ($P^N$) and polymer ($P^x$), group ($N^+$) is bonded to one chain end of said chain ($R_{pf}$) via a sigma bond or via a poly(oxy)alkylene chain [chain ($R_a$)].

More preferably, said chain (Ra) comprises from 1 to 50 fluorine-free oxyalkylene units, said units being the same or different each other and being selected from —OCH(J)CH(J*)-, wherein each of J and J is independently selected from hydrogen atom, straight or branched alkyl or aryl, preferably hydrogen atom, methyl, ethyl or phenyl.

Each of polymer ($P^P$) and polymer ($P^U$) preferably comprises at its chain end(s) group (U).

Preferably, in any of polymer ($P^P$) and polymer ($P^U$), said group (U) is selected in the group consisting of:

$$-O-C(=O)-CR_H=CH_2 \quad (U\text{-I})$$

$$-O-C(=O)-NH-CO-CR_H=CH_2 \quad (U\text{-II})$$

$$-O-C(=O)-R^A-CR_H=CH_2 \quad (U\text{-III})$$

wherein $R_H$ is H or a $C_1$-$C_6$ alkyl group;

$R^A$ is selected from the group consisting of ($R^A$-I) and ($R^A$-II):

($R^A$-I)

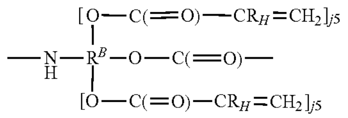

wherein each of j5 is independently 0 or 1 and $R^B$ is a divalent, trivalent or tetravalent group selected from the group consisting of $C_1$-$C_{10}$ aliphatic group; $C_3$-$C_{12}$ cycloaliphatic group; $C_5$-$C_{14}$ aromatic or alkylaromatic group, optionally comprising at least one heteroatom selected from N, O and S;

($R^A$-II)

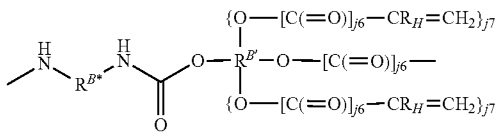

wherein j6 is 0 or 1;

each of j7 is independently 0 or 1;

$R^{B'}$ is a divalent, trivalent or tetravalent group selected from the group consisting of $C_1$-$C_{10}$ aliphatic group; $C_3$-$C_{12}$ cycloaliphatic group; $C_5$-$C_{14}$ aromatic or alkylaromatic group, optionally comprising at least one heteroatom selected from N, O and S; and $R^{B*}$ has the same meanings defined above for $R^{B'}$ or it is a group of formula ($R^B$-I):

($R^B$-I)

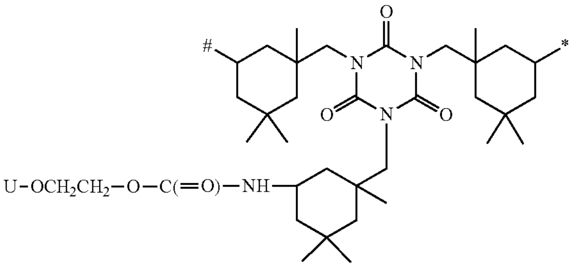

wherein substituent U is selected from the groups (U-I) to (U-III) as defined above and

* and # indicate the bonding site to the nitrogen atoms in formula ($R^A$-II) above.

Preferably, in any of polymer ($P^P$) and polymer ($P^U$), said group (U) is bonded to one chain end of said chain ($R_{pf}$) via group of formula:

$$*-R^{10}-NH-C(=O)-O-R^{11}-\#$$

wherein

* indicate the bond to group (U)

# indicate the bond to chain ($R_{pf}$)

$R^{10}$ is a linear or branched alkyl chain having from 1 to 6 carbon atoms, optionally substituted with a group comprising a tri-alkoxy-silyl group;

$R^{11}$ is a sigma bond or a poly(oxy)alkylene chain [chain ($R_a$^)], wherein said chain ($R_a$^) comprises from 1 to 50 fluorine-free oxyalkylene units, said units being the same or different each other and being selected from —CH(J*)CH(J)-O, wherein each of J and J* is independently selected from hydrogen atom, straight or branched alkyl or aryl, preferably hydrogen atom, methyl, ethyl or phenyl.

According to an alternative embodiment, each of polymer ($P^P$) and polymer ($P^U$) comprises at its chain end(s) group (Si).

Preferably, said group (Si) is a group of formula:

$$—Si—(OR^{30})_3$$

wherein $R^{30}$ is a linear or branched alkyl chain having from 1 to 12 carbon atoms.

Preferably, said polymer ($P^x$) comprises at one chain end a perfluoroalkyl group selected in the group comprising, more preferably consisting of: $—CF_3$, $—C_2F_5$, $—C_3F_7$, $—CF_2Cl$, $—CF_2CF_2Cl$ and $—C_3F_6Cl$.

Said polymer ($P^x$) comprising a perfluoroalkyl group as defined above is also referred to as "monofuntonal polymer ($P^x$)".

As it is known in the art, the functionality (F) of the polymers according to the present invention polymer P, i.e. the average number of functional groups per molecule of polymer, is from 1.00 to 2.00. Bifunctional polymers P typically have a functionality (F) from 1.50 to 1.99, more preferably from 1.70 to 1.98 and even more preferably from 1.85 to 1.95. The functionality (F) can be calculated for example as disclosed in EP 1810987 A (SOLVAY SOLEXIS S.P.A.).

Composition ($C^{POL}$) as defined above can be advantageously prepared starting from (per)fluoropolyether (PFPE) polymers comprising a (per)fluoropolyether chain [chain ($R_{pf}$)] having two chain ends bonded to opposite sides of said chain ($R_{pf}$), both said chain ends comprising at least one —OH group.

For example, first, a composition [composition (INT)] can be prepared by a method comprising the following steps (i) to (iii):

(i) providing a (per)fluoropolyether (PFPE) polymer comprising a (per)fluoropolyether chain [chain ($R_{pf}$)] having two chain ends bonded to opposite sides of said chain ($R_{pf}$), both said chain ends comprising at least one —OH group;

(ii) converting at least a part of said —OH groups into a leaving group for a nucleophilic substitution reaction;

(iii) contacting the composition obtained in step (ii) with at least one tertiary amine, thus obtaining a composition [composition (INT)] comprising:

- a (per)fluoropolyether polymer [polymer ($P^{INT}$)] comprising a (per)fluoropolyether chain [chain ($R_{pf}$)] having two chain ends bonded to opposite sides of said chain ($R_{pf}$), wherein one chain end comprises at least one group comprising at least one quaternary ammonium salt group [group ($N^+$)] and the other chain end comprises at least one —OH group;
- a (per)fluoropolyether polymer [polymer ($P^N$)] comprising a (per)fluoropolyether chain [chain ($R_{pf}$)] having two chain ends bonded to opposite sides of said chain ($R_{pf}$), wherein both chain ends comprise at least one group ($N^+$), and
- the (per)fluoropolyether (PFPE) polymer provided in step (i).

Composition (INT) as defined above is another aspect of the present invention.

Composition ($C^{POL}$) according to the present invention can be advantageously prepared starting from composition (INT) as defined above, according to a method comprising:

(iv) contacting composition (INT) as defined above with at least one compound selected in the group consisting of:

- a compound [A] bearing at least one group (U) as defined above and at least one halogen atom or at least one isocyanate group; or
- a compound [B] bearing at least one group (E) as defined above and at least one halogen atom or at least one isocyanate group; or
- a compound [C] bearing at least one group (Si) as defined above and at least one halogen atom or at least one isocyanate group, thus obtaining said composition ($C^{POL}$).

Furthermore and advantageously, composition (INT) as defined above can be subjected to purification according to methods known in the art in order to purify at least polymer ($P^{INT}$).

According to this embodiment, polymer ($P^{INT}$) is then contacted with at least one of compound [A], [B] or [C] as defined in step (iv) above, thus obtaining polymer ($P^P$) as a pure compound.

It will be hence clear to those skilled in the art that polymer ($P^P$) per se is a further object of the present invention.

According to one embodiment, composition ($C^{POL}$) can be prepared via a one-pot synthesis, i.e. without recovering said composition (INT) from the reaction mixture.

According to this embodiment, composition ($C^{POL}$) is prepared via a method comprising the following steps:

(i) providing a (per)fluoropolyether (PFPE) polymer comprising a (per)fluoropolyether chain [chain ($R_{pf}$)] having two chain ends bonded to opposite sides of said chain ($R_{pf}$), both said chain ends comprising at least one —OH group;

(ii) converting at least a part of said —OH groups into a leaving group for a nucleophilic substitution reaction;

(iii) contacting the composition obtained in step (ii) with at least one tertiary amine, thus obtaining a composition [composition (INT)] as defined above;

(iv) contacting composition (INT) as obtained in step (iii) with at least one compound selected in the group consisting of:

- a compound [A] bearing at least one group (U) as defined above and at least one halogen atom or at least one isocyanate group; or
- a compound [B] bearing at least one group (E) as defined above and at least one halogen atom or at least one isocyanate group; or
- a compound [C] bearing at least one group (Si) as defined above and at least one halogen atom or at least one isocyanate group, thus obtaining composition ($C^{POL}$).

The (per)fluoropolyether (PFPE) polymer used as starting material in step (i) above is preferably a PFPE polymer complying with the following formula:

$$HO—(R_{pf})—OH \quad \text{(PFPE-i)}$$

$$HO—[CH(J^*)CH(J)O]_{t1}—(R_{pf})—[OCH(J)CH(J^*)]_{t2}—OH \quad \text{(PFPE-ii)}$$

wherein ($R_{pf}$) is as defined above, t1 and t2, each independently, is an integer from 1 to 50, and J and J*, each independently, is as defined above for chain (Ra).

Advantageously, under step (ii) above, at least a part of said —OH groups in the PFPE polymer of formula (PFPE-i) or (PFPE-ii) is converted into a group selected in the group comprising, preferably consisting of: mesyl, tosyl, perfluorobutanesulfonyl or trifluoromethylsulfonyl group.

Preferably, under step (iii) above, said at least one tertiary amine complies with the following formula:

$N(R^{h1})(R^{h2})(R^{h3})$ wherein each of $R^{h1}$, $R^{h2}$, and $R^{h3}$ is independently selected from linear or branched alkyl chain having from 1 to 20 carbon atoms, more preferably from 3 to 18, benzyl or at least two of $R^{h1}$, $R^{h2}$, and $R^{h3}$ together with the nitrogen atom form an aliphatic ring comprising 4 or 5 carbon atoms and the nitrogen atom or $R^{h1}$, $R^{h2}$, and $R^{h3}$ together with the nitrogen atom form an aromatic ring comprising 4 or 5 carbon atoms and the nitrogen atom.

Preferably, at least one of $R^{h1}$, $R^{h2}$, and $R^{h3}$ is a linear or branched alkyl chain having from 6 to 20, more preferably from 6 to 18 carbon atoms.

Preferably, at least two of $R^{h1}$, $R^{h2}$, and $R^{h3}$ are independently a linear or branched alkyl chain having from 1 to 6, more preferably from 1 to 4 carbon atoms.

More preferably, said at least one tertiary amine is selected in the group comprising, even more preferably consisting of: N,N-dimethylbenzyl amine; pyridine; 4-nonadecylpyrdine; 1-methylpyrrole; 1-butylpyrrolidine; tributylamine; triisooctylamine; trihexylamine; trioctylamine; N,N-dimethylhexadecyl amine; N,N-dimethyloctylamine; triethylamine.

Preferably, under step (iv), the reaction with said compound [A] bearing at least one group (U) and at least one isocyanate group, is preferred.

Preferably, under step (iv), said compound [A] complies with the following formula:

$O{=}C{=}N{-}R^{20}\text{-}R^{21}{-}CR_H{=}CH_2$ wherein $R_H$ has the same meanings defined above for group (U);

$R^{20}$ is a linear or branched alkyl chain having from 1 to 6 carbon atoms, optionally substituted with a group comprising a tri-alkoxy-silyl group;

$R^{21}$ is a divalent group of formula —O—C(=O)—, —O—C(=O)—NH—CO—, —O—C(=O)—$R^A$— wherein $R^A$ is as defined above for group (U-III).

More preferably, said compound [A] is selected in the group comprising, even more preferably consisting of: isocyanatoethyl methacrylate (IEM), allyl isocyanate, 3-isopropenyl-α,α-dimethylbenzyl isocyanate, vinyl isocyanate, acryloyl isocyanate, methacryloyl isocyanate, 2-isocyanatoethyl acrylate, 1,1-(bisacryloyloxy methyl) ethyl isocyanate, 2-(2-metacryloyloxyethyloxy) ethyl isocyanate.

As disclosed above, said composition ($C^{POL}$) can be used as such or it can be used as additive in a suitable solvent.

Preferably, composition (DIL) comprises from 0.01 to 50 wt. % of composition ($C^{POL}$) and from 50 to 99.99 wt. % of at least one solvent (S) as defined above.

Advantageously, said solvent (S) is selected from (per) fluoropolyether polymers having at the chain ends thereof at least one, more preferably at least two, unsaturated group(s).

According to another embodiment, the present invention relates to a method for imparting antimicrobial properties to an article, said method comprising:

(a) providing composition ($C^{POL}$) or composition (DIL) as defined above;

(b) proving an article having at least one surface;

(c) contacting said composition ($C^{POL}$) or composition (DIL) and at least one part of said at least one surface;

(d) coating said at least one part of said at least one surface with said composition ($C^{POL}$) or composition (DIL).

Advantageously, said article is selected from articles made of plastic, metal, glass, paper or textiles, such as notably cotton paper. More preferably, said article is a banknote.

Preferably, when composition ($C^{POL}$) or composition (DIL) comprises polymer ($P^P$) and ($P^U$) comprising said group (U), step (d) is performed by curing said composition ($C^{POL}$) or composition (DIL) more preferably with UV rays.

Should the disclosure of any patents, patent applications, and publications, which are incorporated herein by reference conflict with the description of the present application to the extent that it may render a term unclear, the present description shall take precedence.

The invention will be herein after illustrated in greater detail by means of the Examples contained in the following Experimental Section; the Examples are merely illustrative and are by no means to be interpreted as limiting the scope of the invention.

EXPERIMENTAL SECTION

Materials and Methods

Fluorolink® E10H and Fluorolink® MD700 were obtained from Solvay Specialty Polymers Italy S.p.A.

The following were obtained by Aldrich: bis(trifluoromethyl)benzene, trietylamine, methanesulfonyl chloride, N,N-dimethylhexadecylamine, 2,6-di-tert-butyl-4-methylphenol (BHT) and 2-isocyanatoethyl methacrylate.

SnapCure™ 1030 was obtained from Alfa Aesar Gmbh &Co.

$^1$H-NMR and $^{19}$F-NMR were recorded on a Agilent System 500 operating at 499.86 MHz for $^1$H and 470.30 MHz for $^{19}$F.

FT-IR spectra were measured with a ThermoScientific FTIR spectrophotometer on liquid samples as thin films on KBr. Spectra were acquired by co-adding 256 scans with a resolution of 2 $cm^{-1}$.

Example 1—Synthesis of Composition $C^{POL}$-A

Step 1: A 4-necked round bottom flask with 0.5 L capacity, kept under nitrogen atmosphere and equipped with a condenser, a mechanical stirrer, a thermometer probe and a dropping funnel, was charged with 150 g (EW=g/mol 906; 165.6 meq) of Fluorolink® E10H, 100 g of 1,3-bis(trifluoromethyl)benzene and 5.9 g trietylamine (58.4 meq). Thereafter, the flask was refrigerated and 5.8 g of methanesulfonyl chloride (50.6 meq) were added at such a rate as to keep the temperature in the range of 15-30° C. When the methanesulfonyl chloride addition was complete, the reaction-mixture was let under stirring at 25-30° C. for further 6 hours. The reaction mixture was then brought to neutrality by adding a 4M aqueous solution of HCl and the thereby formed organic phase was separated. After distillation of the fluorinated solvent under reduced pressure (T=80° C., P=2 Pa), 152.1 g of a limpid liquid were isolated and characterized. $^1$H-NMR analysis confirmed that the obtained product was the starting Fluorolink® E10H with 29% of the —OH groups converted into mesylate esters.

Step 2: A 4-necked round bottom flask of 0.25 L capacity, kept under nitrogen atmosphere and equipped with a condenser, a mechanical stirrer, a thermometer probe and a dropping funnel, was charged with 100 g of 1,3-bis(trifluoromethyl)benzene and 9.0 g (33.4 meq) of N,N-dimethylhexadecylamine. 100 g of the product obtained in Step 1 were dropped into the flask and the resulting mixture was heated up to 90° and let under vigorous stirring for 20 hours. Distillation under reduced pressure (T=80° C., P=2 Pa) to remove the solvent provided 107.1 g of a waxy product. $^1$H NMR analysis confirmed the quantitative conversion of the mesylate esters into the target quaternary ammonium salt.

Step 3: A4-necked round bottom flask of 100 ml capacity, equipped with a condenser, a mechanical stirrer a dropping funnel and a thermometer probe, was charged with 100 g of the product obtained in Step 2, $3.9*10^{-2}$ g of 2,6-di-tert-butyl-4-methylphenol (BHT), $8.5*10^{-2}$ g of SnapCure™ 1030 and the obtained mixture was heated up to 50° C.

11.8 g of 2-isocyanatoethyl methacrylate (76.1 meq) were then slowly added, the temperature was raised up to 60° C. and the reaction mixture was let under vigorous stirring for 3 hours. Thereafter, 1.6 g of methanol were added, the reaction mixture was stirred for further 2 hours and dried under reduced pressure (T=60° C., P=2 Pa) obtaining 108.3 g of $C^{POL}$-A.

$C^{POL}$-A was recovered as a viscous slightly yellow liquid, statistically comprising:

41.2% of Polymer $P^P$-A;

50.4% of Polymer $P^U$-A and 8.4% of Polymer $P^N$-A

Measurement of Anti-Bacterial Activity on Glass Substrate

Anti-bacterial activity of a composition comprising 80 wt. % of Fluorolink® MD700 and 20 wt. % of the composition of polymers $C^{POL}$-A prepared under Example 1 above was evaluated according to ISO 22196.

The growth of two species of bacteria, namely *S. aureus* and *E. Coli*, was evaluated onto glass substrate, prepared as described in the ISO 22196 test.

The glass substrate contacted with the composition according to the present invention passed the ISO 22196 test.

The invention claimed is:

1. A composition [composition ($C^{POL}$)] comprising:

a (per)fluoropolyether polymer [polymer ($P^P$)] comprising a (per)fluoropolyether chain [chain ($R_{pf}$)] having two chain ends bonded to opposite sides of said chain ($R_{pf}$), wherein one chain end comprises at least one group comprising at least one quaternary ammonium salt group [group ($N^+$)] and the other chain end comprises at least one group selected from the group consisting of: alkoxysilane [group (Si)] and a cross-linkable group;

a (per)fluoropolyether polymer [polymer ($P^U$)], different from polymer ($P^P$), comprising a (per)fluoropolyether chain [chain ($R_{pf}$)] having two chain ends bonded to opposite sides of said chain ($R_{pf}$), wherein both chain ends comprise one group-elected in selected from the group consisting of: alkoxysilane [group (Si)] and a cross-linkable group; and a (per)fluoropolyether polymer [polymer ($P^N$)], different from polymer ($P^P$) and polymer ($P^U$), comprising a (per)fluoropolyether chain [chain ($R_{pf}$)] having two chain ends bonded to opposite sides of said chain ($R_{pf}$), wherein both chain ends comprise at least one group ($N^+$);

wherein said composition ($C^{POL}$) comprises:

from 5 to 50 wt. % of said polymer ($P^P$);

from 0.01 to 15 wt. % of said polymer ($P^N$); and from 35 to 94.99 wt. % of said polymer ($P^U$); the amounts being based on 100 wt. % of said composition ($C^{POL}$).

2. The composition ($C^{POL}$) according to claim 1, said composition ($C^{POL}$) further comprising:

a (per)fluoropolyether polymer [polymer ($P^x$)] comprising a (per)fluoropolyether chain [chain ($R_{pf}$)] having two chain ends bonded to opposite sides of said chain ($R_{pf}$), wherein one chain end comprises a perfluoroalkyl group and the other chain end comprises either at least one quaternary ammonium salt group ($N^+$) or at least one group selected from the group consisting of: alkoxysilane [group (Si)], and a cross-linkable group.

3. The composition ($C^{POL}$) according to claim 2, wherein said polymer ($P^X$) is in an amount up to 15 wt. % based on the total weight of composition ($C^{POL}$).

4. The composition ($C^{POL}$) according to claim 2, wherein in any of polymer ($P^P$), polymer ($P^U$), polymer ($P^N$) and polymer ($P^X$), said chain ($R_{pf}$) is a chain of formula $$-D-(CFX^{\#})_{z1}—O(R_f)(CFX^*)_{z2}-D^*-$$

wherein z1 and z2, equal or different from each other, are equal to or higher than 1;

$X^{\#}$ and $X^*$, equal or different from each other, are —F or —$CF_3$, provided that when z1 and/or z2 are higher than 1, $X^{\#}$ and $X^*$ are —F;

D and D*, equal or different from each other, are a sigma bond or an alkylene chain comprising from 1 to 6, said alkyl chain being optionally substituted with at least one perfluoroalkyl group comprising from 1 to 3 carbon atoms;

($R_f$) comprises repeating units $R^o$, said repeating units being independently selected from the group consisting of:

(i) —CFXO—, wherein X is F or $CF_3$;

(ii) —CFXCFXO—, wherein X, equal or different at each occurrence, is F or $CF_3$, with the proviso that at least one of X is —F;

(iii) —$CF_2CF_2CW_2O$—, wherein each of W, equal or different from each other, are F, Cl, H;

(iv) —$CF_2CF_2CF_2CF_2O$—;

(v) —$(CF_2)_j$—CFZ—O— wherein j is an integer from 0 to 3 and Z is a group of general formula —O—$R_{(f-a)}$-T, wherein $R_{(f-a)}$ is a fluoropolyoxyalkene chain comprising a number of repeating units from 0 to 10, said recurring units being selected from the group consisting of: —CFXO—, —$CF_2CFXO$—, —$CF_2CF_2CF_2O$—, and —$CF_2CF_2CF_2CF_2O$—, with each of X being independently F or $CF_3$ and T being a $C_1$-$C_3$ perfluoroalkyl group.

5. The composition ($C^{POL}$) according to claim 2, wherein in any of polymer ($P^P$), polymer ($P^N$) and polymer ($P^X$), said group ($N^+$) is selected from groups having formula ($N^+$-I):

$$(N^+\text{-I})\_-N^+(R^{h1})(R^{h2})(R^{h3})$$

wherein each of $R^{h1}$, $R^{h2}$, and $R^{h3}$ is independently selected from linear or branched alkyl chain having from 1 to 20 carbon atoms, benzyl or at least two of $R^{h1}$, $R^{h2}$, and $R^{h3}$ together with the nitrogen atom form a 5- or 6-membered aliphatic ring or $R^{h1}$, $R^{h2}$, and $R^{h3}$ together with the nitrogen atom form a 5- or 6-membered aromatic ring.

6. The composition ($C^{POL}$) according to claim 2, wherein in any of polymer ($P^P$) and polymer ($P^U$), said cross-linkable group is an unsaturated moiety group (U), wherein group (U) is selected from the group consisting of:

$$—O—C(=O)—CR_H=CH_2 \quad \text{(U-I)}$$

$$—O—C(=O)—NH—CO—CR_H=CH_2 \quad \text{(U-II)}$$

$$—O—C(—O)—R^A—CR_H=CH_2 \quad \text{(U-III)}$$

wherein $R_H$ is H or a $C_1$-$C_6$ alkyl group;

$R^A$ is selected from the group consisting of ($R^A$-I) and ($R^A$-II):

($R^A$-I)

($R^A$-I)

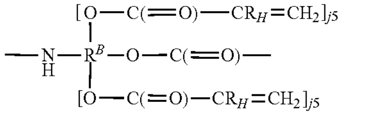

wherein each of j5 is independently 0 or 1 and $R^B$ is a divalent, trivalent or tetravalent group selected from the group consisting of $C_1$-$C_{10}$ aliphatic group; $C_3$-$C_{12}$ cycloaliphatic group; $C_5$-$C_{14}$ aromatic or alkylaromatic group, optionally comprising at least one heteroatom selected from N, O and S;

($R^A$-II)

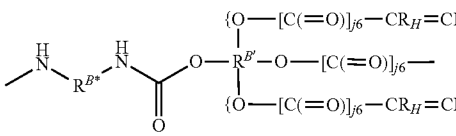

wherein j6 is 0 or 1;

each of j7 is independently 0 or 1;

$R^{B'}$ is a divalent, trivalent or tetravalent group selected from the group consisting of $C_1$-$C_{10}$ aliphatic group; $C_3$-$C_{12}$ cycloaliphatic group; $C_5$-$C_{14}$ aromatic or alkylaromatic group, optionally comprising at least one heteroatom selected from N, O and S; and $R^{B*}$ has the same meanings as $R^{B'}$ or it is a group of formula ($R^B$-I):

($R^B$-I)

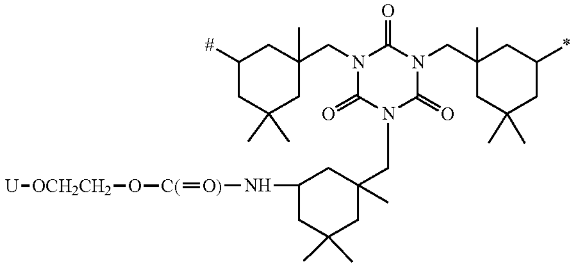

wherein substituent U is selected from the groups (U-I) to (U-III)

and

* and # indicate the bonding site to the nitrogen atoms in formula ($R^A$-II).

7. The composition ($C^{POL}$) according to claim 6, wherein in any of polymer ($P^P$), polymer ($P^N$) and polymer ($P^X$), group ($N^+$) is bonded to one chain end of said chain ($R_{pf}$) via a sigma bond or via a poly(oxy)alkylene chain [chain ($R_a$)]; and/or in any of polymer ($P^P$) and polymer ($P^U$), said group (U) is bonded to one chain end of said chain ($R_{pf}$) via group of formula:

$$*—R^{10}—NH—C(=O)—O—R^{11}\text{-}\#$$

wherein

* indicate the bond to group (U);

# indicate the bond to chain ($R_{pf}$);

$R^{10}$ is a linear or branched alkyl chain having from 1 to 6 carbon atoms, optionally substituted with a group comprising a tri-alkoxy-silyl group;

$R^{11}$ is a sigma bond or a poly(oxy)alkylene chain [chain ($R_a\hat{}$)], wherein said chain ($R_a\hat{}$) comprises from 1 to 50 fluorine-free oxyalkylene units, said units being the same or different each other and being selected from

—CH(J*)CH(J)-O, wherein each of J and J* is independently selected from hydrogen atom, straight or branched alkyl or aryl.

8. A method for the manufacture of composition ($C^{POL}$) as defined in claim 1, said method comprising:

(iv) contacting composition (INT), composition [composition (INT)] comprising:

a (per)fluoropolyether polymer [polymer ($P^{INT}$)] comprising a (per)fluoropolyether chain [chain ($R_{pf}$)] having two chain ends bonded to opposite sides of said chain ($R_{pf}$), wherein one chain end comprises at least one group comprising at least one quaternary ammonium salt group [group ($N^+$)] and the other chain end comprises at least one-OH group;

a (per)fluoropolyether polymer [polymer ($P^N$)] comprising a (per)fluoropolyether chain [chain ($R_{pf}$)] having two chain ends bonded to opposite sides of said chain ($R_{pf}$), wherein both chain ends comprise at least one group ($N^+$); and a (per)fluoropolyether (PFPE) polymer comprising a (per)fluoropolyether chain [chain ($R_{pf}$)] having two chain ends bonded to opposite sides of said chain ($R_{pf}$), both said chain ends comprising at least one-OH group;

with at least one compound selected from the group consisting of:

a compound [A] bearing at least one group (U) and at least one halogen atom or at least one isocyanate group; or a compound [B] bearing at least one group (E) and at least one halogen atom or at least one isocyanate group; or a compound [C] bearing at least one group (Si) and at least one halogen atom or at least one isocyanate group, thus obtaining composition ($C^{POL}$).

9. The method according to claim 8, wherein in step (iv), said compound [A] complies with the following formula:

$$O—C=N—R^{20}\text{-}R^{21}—CR_H=CH_2$$

wherein $R_H$ is H or a $C_1$-$C_6$ alkyl group;

$R_{20}$ is a linear or branched alkyl chain having from 1 to 6 carbon atoms, optionally substituted with a group comprising a tri-alkoxy-silyl group; and $R^{21}$ is a divalent group of formula —O—C(=O)—, —O—C(—O)—NH—CO—, and —O—C(=O)—$R^A$— wherein $R^A$ is selected from the group consisting of ($R^A$-I) and ($R^A$-II):

($R^A$-I)

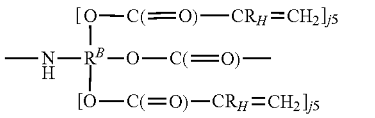

wherein each of j5 is independently 0 or 1 and $R^B$ is a divalent, trivalent or tetravalent group selected from the group consisting of $C_1$-$C_{10}$ aliphatic group; $C_3$-$C_{12}$ cycloaliphatic group; $C_5$-$C_{14}$ aromatic or alkylaromatic group, optionally comprising at least one heteroatom selected from N, O and S;

($R^A$-II)

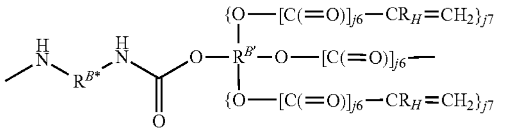

wherein j6 is 0 or 1;

each of j7 is independently 0 or 1;

$R^{B'}$ is a divalent, trivalent or tetravalent group selected from the group consisting of $C_1$-$C_{10}$ aliphatic group; $C_3$-$C_{12}$ cycloaliphatic group; $C_5$-$C_{14}$ aromatic or alkylaromatic group, optionally comprising at least one heteroatom selected from N, O and S; and $R^{B*}$ has the same meanings as $R^{B'}$ or it is a group of formula ($R^B$-I):

($R^B$-I)

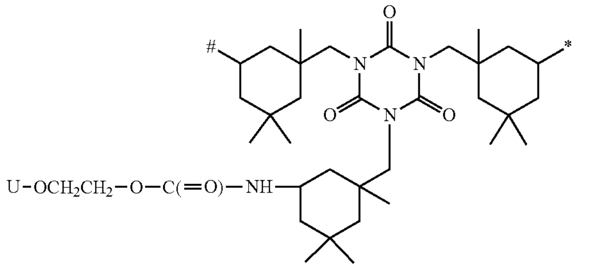

wherein substituent U is selected from the groups (U-I) to (U-III), where (U-I) is-O—C(═O)—$CR_H$═$CH_2$, (U-II) is-O—C(—O)—NH—CO—$CR_H$—$CH_2$, and (U-III) is-O—C(═O)—$R^A$—$CR_H$═$CH_2$ and

* and # indicate the bonding site to the nitrogen atoms in formula ($R^A$-II).

10. A composition [composition (DIL)] comprising composition ($C^{POL}$) as defined in claim 1 and at least one solvent [solvent(S)] selected from the group consisting of: (per)fluorinated fluids, optionally comprising at least one unsaturated moiety; and hydrogenated fluids, optionally comprising at least one unsaturated moiety.

11. The composition (DIL) according to claim 10, said composition (DIL) comprising from 0.01 to 50 wt. % of composition ($C^{POL}$) and from 50 to 99.99 wt. % of at least one solvent (S), wherein said solvent (S) is a (per)fluoropolyether polymer having at the chain ends thereof at least one unsaturated group.

12. A method for imparting antimicrobial properties to a substrate, said method comprising:

(a) providing composition ($C^{POL}$) as defined in claim 1 or composition (DIL), comprising composition ($C^{POL}$) and at least one solvent [solvent(S)] selected from the group consisting of: (per)fluorinated fluids, optionally comprising at least one unsaturated moiety; and hydrogenated fluids, optionally comprising at least one unsaturated moiety;

(b) proving an article having at least one surface;

(c) contacting said composition ($C^{POL}$) or composition (DIL) and at least one part of said at least one surface;

(d) coating said at least one part of said at least one surface with said composition ($C^{POL}$) or composition (DIL).

13. The method according to claim 12, wherein said article is selected from articles made of plastic, metal, glass, paper or textiles.

14. The composition ($C^{POL}$) according to claim 1, wherein the cross-linkable group in each of polymer ($P^P$) and polymer ($P^U$) is selected from unsaturated moiety [group (U)], and epoxide [group (E)].

15. The composition ($C^{POL}$) according to claim 2, wherein the cross-linkable group in polymer ($P^X$) is selected from unsaturated moiety [group (U)], and epoxide [group (E)].

16. A composition [composition (INT)] comprising:

a (per)fluoropolyether polymer [polymer ($P^{INT}$)] comprising a (per)fluoropolyether chain [chain ($R_{pf}$)] having two chain ends bonded to opposite sides of said chain ($R_{pf}$), wherein one chain end comprises at least one group comprising at least one quaternary ammonium salt group [group ($N^+$)] and the other chain end comprises at least one-OH group;

a (per)fluoropolyether polymer [polymer ($P^N$)] comprising a (per)fluoropolyether chain [chain ($R_{pf}$)] having two chain ends bonded to opposite sides of said chain ($R_{pf}$), wherein both chain ends comprise at least one group ($N^+$); and a (per)fluoropolyether (PFPE) polymer comprising a (per)fluoropolyether chain [chain ($R_{pf}$)] having two chain ends bonded to opposite sides of said chain ($R_{pf}$), both said chain ends comprising at least one-OH group;

wherein said composition ($C_{INT}$) comprises:

from 5 to 50 wt. % of said polymer ($P^{INT}$);

from 0.01 to 15 wt. % of said polymer ($P^N$); and from 35 to 94.99 wt. % of said (per)fluoropolyether (PFPE); the amounts being based on 100 wt. % of said composition ($C^{POL}$).

17. A method for the manufacture of a composition [composition (INT)] according to claim 16, said method comprising steps from (i) to (iii):

(i) providing a (per)fluoropolyether (PFPE) polymer comprising a (per)fluoropolyether chain [chain ($R_{pf}$)] having two chain ends bonded to opposite sides of said chain ($R_{pf}$), both said chain ends comprising at least one —OH group;

(ii) converting at least a part of said-OH groups into a leaving group for a nucleophilic substitution reaction;

(iii) contacting the composition obtained in step (ii) with at least one tertiary amine, thus obtaining the composition (INT) according to claim 16.

18. The method according to claim 17, wherein the PFPE polymer in step (i) complies with the following formula:

$$HO—(R_{pf})—OH \quad \text{(PFPE-i)}$$

$$HO—[CH(J^*)CH(J)O]_{t1}—(R_{pf})—[OCH(J)CH(J^*)]_{t2}—OH \quad \text{(PFPE-ii)}$$

wherein t1 and t2, each independently, is an integer from 1 to 50, and

J and J*, each independently, is independently selected from hydrogen atom, straight or branched alkyl or aryl for chain (Ra); and/or in step (ii) at least a part of said-OH groups in the PFPE polymer of formula (PFPE-i) or (PFPE-ii) provided in step (i) is converted into a group selected from the group consisting of: mesyl, tosyl, perfluorobutanesulfonyl or trifluoromethylsulfonyl group; and/or in step (iii) said at least one tertiary amine complies with the following formula:

$$N(R^{h1})(R^{h2})(R^{h3})$$

wherein each of $R^{h1}$, $R^{h2}$, and $R^{h3}$ is independently selected from linear or branched alkyl chain having from 1 to 20 carbon atoms, benzyl or at least two of $R^{h1}$, $R^{h2}$, and $R^{h3}$ together with the nitrogen atom form an aliphatic ring comprising 4 or 5 carbon atoms and the nitrogen atom or $R^{h1}$, $R^{h2}$, and $R^{h3}$ together with the nitrogen atom form an aromatic ring comprising 4 or 5 carbon atoms and the nitrogen atom.

19. A (per)fluoropolyether polymer [polymer ($P^P$)] comprising a (per)fluoropolyether chain [chain ($R_{pf}$)] having two chain ends bonded to opposite sides of said chain ($R_{pf}$), wherein one chain end comprises at least one group comprising at least one quaternary ammonium salt group [group ($N^+$)] and the other chain end comprises at least one group selected from the group consisting of: alkoxysilane [group (Si)], and a cross-linkable group;

wherein said group (N) is selected from groups having formula ($N^+$-I):

$$-N^+(R^{h1})(R^{h2})(R^{h3}) \quad (N^+\text{-I})$$

wherein each of $R^{h1}$, $R^{h2}$, and $R^{h3}$ is independently selected from linear or branched alkyl chain having from 1 to 20 carbon atoms, benzyl or at least two of $R^{h1}$, $R^{h2}$, and $R^{h3}$ together with the nitrogen atom form a 5- or 6-membered aliphatic ring or $R^{h1}$, $R^{h2}$, and $R^{h3}$ together with the nitrogen atom form a 5- or 6-membered aromatic ring;

wherein said cross-linkable group is an unsaturated moiety group (U), wherein group (U) is selected from the group consisting of:

$$—O—C(—O)—CR_H═CH_2 \quad \text{(U-I)}$$

$$—O—C(═O)—NH—CO—CR_H—CH_2 \quad \text{(U-II)}$$

$$—O—C(═O)—R^A—CR_H═CH_2 \quad \text{(U-III)}$$

wherein $R_H$ is H or a $C_1$-$C_6$ alkyl group;

$R^A$ is selected from the group consisting of ($R^A$-I) and ($R^A$-II):

($R^A$-I)

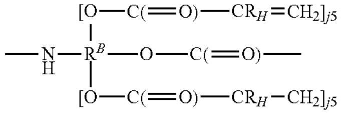

wherein each of j5 is independently 0 or 1 and $R^B$ is a divalent, trivalent or tetravalent group selected from the group consisting of $C_1$-$C_{10}$ aliphatic group; $C_3$-$C_{12}$ cycloaliphatic group; $C_5$-$C_{14}$ aromatic or alkylaromatic group, optionally comprising at least one heteroatom selected from N, O and S;

($R^A$-II)

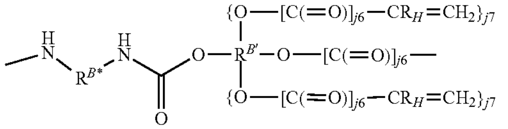

wherein j6 is 0 or 1;

each of j7 is independently 0 or 1;

$R^{B'}$ is a divalent, trivalent or tetravalent group selected from the group consisting of $C_1$-$C_{10}$ aliphatic group; $C_3$-$C_{12}$ cycloaliphatic group; $C_5$-$C_{14}$ aromatic or alkylaromatic group, optionally comprising at least one heteroatom selected from N, O and S; and $R^{B*}$ has the same meanings as $R^{B'}$ or it is a group of formula ($R^B$-I):

($R^B$-I)

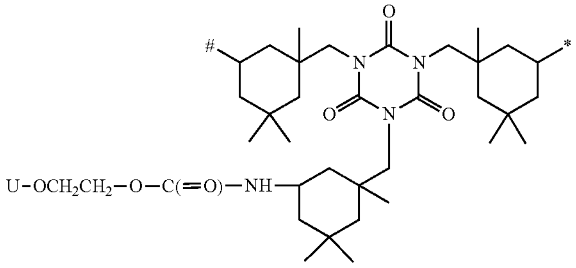

wherein substituent U is selected from the groups (U-I) to (U-III) and

* and # indicate the bonding site to the nitrogen atoms in formula ($R^A$-II); and wherein said group (U) is bonded to one chain end of said chain ($R_{pf}$) via group of formula:

$$*—R^{10}—NH—C(═O)—O—R^{11}\text{-}\#$$

wherein

* indicate the bond to group (U);

\# indicate the bond to chain ($R_{pf}$);

$R^{10}$ is a linear or branched alkyl chain having from 1 to 6 carbon atoms, optionally substituted with a group comprising a tri-alkoxy-silyl group;

$R^{11}$ is a sigma bond or a poly(oxy)alkylene chain [chain ($R_a\hat{}$)], wherein said chain ($R_a\hat{}$) comprises from 1 to 50 fluorine-free oxyalkylene units, said units being the same or different each other and being selected from

—CH(J*)CH(J)-O, wherein each of J and J* is independently selected from hydrogen atom, straight or branched alkyl or aryl.

* * * * *